United States Patent [19]
Steinmann

[11] Patent Number: 5,860,414
[45] Date of Patent: Jan. 19, 1999

[54] TROUGH-SHAPED COLLECTOR

[75] Inventor: Wolf-Dieter Steinmann, Sindelfingen, Germany

[73] Assignee: Deutsche Forschungsanstalt fuer Luft- und Raumfahrt e.V., Bonn, Germany

[21] Appl. No.: 807,265

[22] Filed: Feb. 28, 1997

[30] Foreign Application Priority Data

Mar. 2, 1996 [DE] Germany ............... 196 08 138.6

[51] Int. Cl.⁶ ...................................... F24J 2/10
[52] U.S. Cl. ................. 126/657; 126/692; 126/701
[58] Field of Search .................. 126/657, 652, 126/651, 654, 692, 693, 694, 695, 701, 691, 678, 679, 683, 684, 698; 165/DIG. 109, DIG. 110, DIG. 111, DIG. 113, DIG. 114

[56] References Cited

U.S. PATENT DOCUMENTS

| | | | |
|---|---|---|---|
| 4,094,299 | 6/1978 | Voelker | 126/674 |
| 4,134,393 | 1/1979 | Stark et al. | |
| 4,143,643 | 3/1979 | Gerin et al. | |
| 4,249,516 | 2/1981 | Stark | |
| 4,289,118 | 9/1981 | Stark | |
| 4,320,246 | 3/1982 | Bussell | |
| 4,505,260 | 3/1985 | Metzger | |
| 4,520,794 | 6/1985 | Stark et al. | |
| 4,680,090 | 7/1987 | Lew | 126/651 |
| 5,177,977 | 1/1993 | Larsen | |
| 5,465,708 | 11/1995 | Goebel et al. | |
| 5,505,917 | 4/1996 | Collier, Jr. | 126/694 |

FOREIGN PATENT DOCUMENTS

| | | | |
|---|---|---|---|
| 84971 | 3/1977 | Australia | 126/651 |
| 003405476 | 8/1985 | Germany | 126/651 |
| 43 31 784 | 3/1995 | Germany | |
| 25 36 800 | 4/1996 | Germany | |
| 001453125 | 1/1989 | U.S.S.R. | 126/651 |

*Primary Examiner*—Carl D. Price
*Attorney, Agent, or Firm*—Barry R. Lipsitz; Ralph F. Hoppin

[57] ABSTRACT

In order to provide a trough-shaped collector for radiation, in particular for solar radiation, comprising a trough-shaped mirror extending in longitudinal direction and reflecting the radiation into a focus region, and an absorber line extending in longitudinal direction through the focus region of the trough-shaped mirror and having a guide tube for the heat transport medium and an absorber pipe surrounding the guide tube such that an annular chamber is formed between guide tube and absorber line, with which the problems existing as a result of the uneven irradiation of the absorber line are also reduced or eliminated, it is suggested that an annular passage medium flow in the annular chamber and that the annular passage medium couple the guide tube thermally to the absorber pipe.

17 Claims, 5 Drawing Sheets

TROUGH-SHAPED COLLECTOR

BACKGROUND OF THE INVENTION

The invention relates to a trough-shaped collector for radiation, in particular for solar radiation, comprising a trough-shaped mirror which extends in longitudinal direction and reflects the radiation into a focus region and an absorber line which extends in longitudinal direction through the focus region of the trough-shaped mirror and has a guide tube for the heat transport medium and an absorber pipe surrounding the guide tube such that an annular chamber is formed between guide tube and absorber pipe.

Trough-shaped collectors of this type are known from the state of the art.

In a known trough-shaped collector, the absorber line is preferably formed by a pipe which is arranged in the focus region of the trough-shaped mirror. As a result of its construction, the trough-shaped mirror does not have an ideal focal line but rather a focus region which can have an extension of approximately 1% of the mirror diameter. Since the aim is to have a large mirror aperture and thus a large mirror diameter for the trough-shaped mirror, it is necessary for the pipe to have a large diameter in order to cover the entire focus region as absorber. In this respect, absorber pipes, the diameter of which can be in the order of magnitude of 10 cm, are required for a trough-shaped mirror which has, for example, a diameter of 10 m.

As a result of the radiation reflected from the trough-shaped mirror into the focus region, the pipe is heated unevenly in circumferential direction. Due to the thermal load, mechanical problems result with respect to pressure resistance and rigidity of the pipe, in particular, when the pipe has a large diameter.

Furthermore, the pipe bends out of its optimum position in the focus region and so an optimum irradiation of the absorber line is no longer ensured and the degree of efficiency of the trough-shaped collector deteriorates.

In the case of the trough-shaped collector according to DE 43 31 784, the heat transport medium is guided in a guide tube within the absorber line on account of these problems, a thermal coupling element similar to a heat pipe taking care of the transfer of heat to the heat transport medium which takes place by way of vaporization of the heat transfer medium located in the annular chamber at the hot locations and subsequent diffusion of the vapor due to condensation at the colder locations of the gas chamber. Trough-shaped collectors of this type place great demands on the physical properties of the heat transfer medium and the production possibilities.

Proceeding on the basis of DE 43 31 784, the object underlying the invention is therefore to provide a trough-shaped collector of the generic type which has as simple a conception as possible and in which the problems existing as a result of the uneven irradiation of the absorber line are also reduced or eliminated.

SUMMARY OF THE INVENTION

The object is accomplished in accordance with the invention, in the trough-shaped collector of the type described at the outset, in that an annular passage medium flows in the annular chamber and that the annular passage medium couples the guide tube thermally to the absorber pipe.

As a result of the heat transfer medium flowing in the annular chamber, an efficient thermal coupling of absorber pipe and guide tube, which are mechanically uncoupled, is achieved and there is the possibility of influencing the thermal coupling via the pressure, to which the annular passage medium is subject, and the velocity, with which the annular passage medium flows. The flowing annular passage medium sees to it that differences in temperature are compensated and thus the guide tube is evenly heated in its circumferential direction.

This means that the wear and tear on the guide tube and the absorber pipe is diminished. The system also reacts more quickly to control interventions since the guide tube has a smaller diameter than the absorber pipe and thus the flow velocity for the heat transport medium is higher in relation to a pipe with a greater diameter when the mass flow rate is the same.

The annular passage medium has, in addition, a buffer effect so that the influence of short-term operational variations, such as, for example, cloud covering of the sun, on the heat transport medium is reduced.

The pressure, to which the annular passage medium is subject in the annular chamber, is preferably selected such that the annular passage medium is present in the fluid state at the maximum temperature which can be attained. The resulting single-phase flow of a fluid in the annular chamber provides for an optimum heat coupling of the absorber pipe to the guide tube.

In addition, the mechanical stability of the device is increased since the fluid flowing in the annular passage decreases the thermal load on the absorber pipe and increases its flexibility.

The absorber screen could be part of the absorber pipe so that the material resources are reduced.

The transfer of heat from the absorber pipe to the heat transport medium flowing in the guide tube is particularly efficient when the mass flow rate of annular passage medium through the annular chamber is greater than the mass flow rate of heat transport medium through the guide tube.

It is, in particular, expedient when the annular passage medium is conveyed in a circuit so that only slight losses of annular passage medium occur. In addition, the heat coupling function of the annular passage medium is improved by the fact that preheated annular passage medium flows in the circuit.

The heat transfer medium in the annular passage can, in principle, be any optional medium, provided that it is present in the fluid state at the maximum attainable temperature and at the adjustable pressures. Conceivable would be, for example, water or potassium.

Special advantages result when the annular passage medium and the heat transport medium are formed by the same medium. Water is customarily used as heat transport medium.

The annular passage medium flowing in the annular chamber has a buffer effect and so short-term operational variations, such as, for example, a covering of the sun by clouds, is compensated. In addition, the annular passage medium in the absorber pipe improves its mechanical stability since the single-phase flow in the annular chamber increases the flexibility of the absorber pipe.

In this case, it is, in particular, advantageous when the annular passage medium is likewise water.

Extensive control possibilities result for the inventive device when annular passage medium can be sprayed from the annular chamber into the guide tube via nozzles mounted in the guide tube.

As a result of a control unit which registers the temperature of the annular passage medium in the annular chamber and the temperature of the heat transport medium in the guide tube via temperature sensors and which controls the amount of annular passage medium which is sprayed from the annular chamber into the guide tube via the nozzle elements for the purpose of temperature regulation, deviations from the normal course of operation, such as, for example, temperatures in the guide tube which are too high or temperatures in the annular passage medium which are too high, can be corrected.

When the nozzle elements each have a valve drive, by means of which the flow capacity through the nozzle elements is controlled, the possibility then results of addressing each nozzle element individually by means of the control unit and of regulating the flow capacity of annular passage medium into the guide pipe in an optimum manner.

For achieving an optimum heat coupling of the absorber screen to the guide tube it is advantageous when the outer cylindrical surface of the guide tube has a structure aiding the intermixing of the annular passage medium so that the annular passage medium is evenly heated in the annular passage.

It has a particularly favorable effect for the heat absorption of the heat transport medium when the inner cylindrical surface of the guide tube has a flow-stabilizing structure promoting the intermixing so that the heat transport medium is evenly heated over a cross-sectional area of the guide tube.

Additional features and advantages are the subject matter of the following description as well as the drawings illustrating several embodiments.

DETAILED DESCRIPTION OF THE INVENTION

Figure 1:
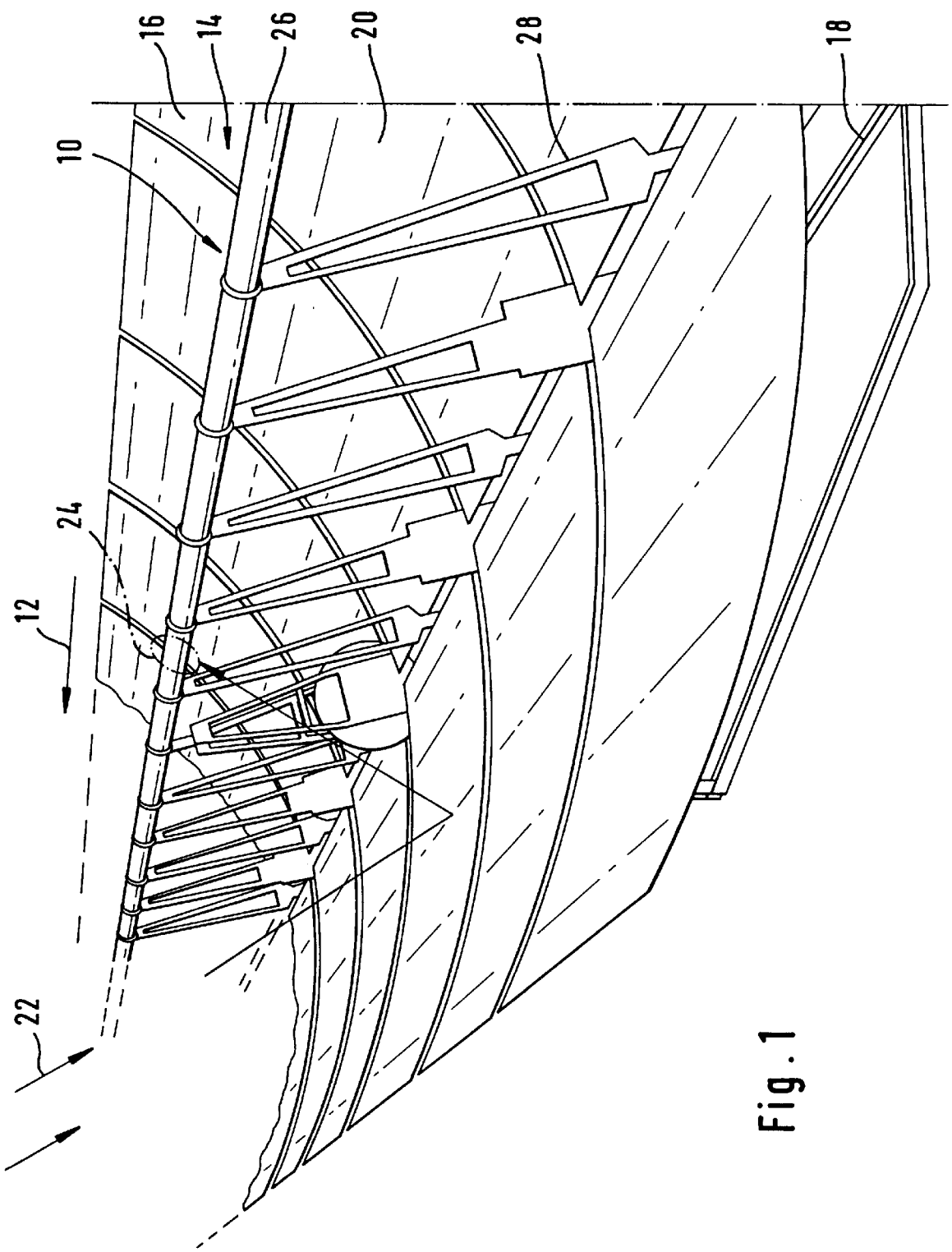
FIG. 1 shows a schematic, perspective illustration of an inventive trough-shaped collector.

One embodiment of an inventive trough-shaped collector is illustrated in FIG. 1, the trough-shaped collector designated as a whole as 10 extending in a longitudinal direction 12 and having a trough-shaped mirror 12 which has individual mirror elements 16 which preferably have a parabolic shape and are mounted on a mirror frame 18. The mirror surfaces 20 reflect the incoming radiation 22 towards a focal line 24, the absorber line 26 being mounted in the region of the focal line 24 and being held by support struts 28 at a defined distance in relation to the mirror surfaces 20.

Figure 2:
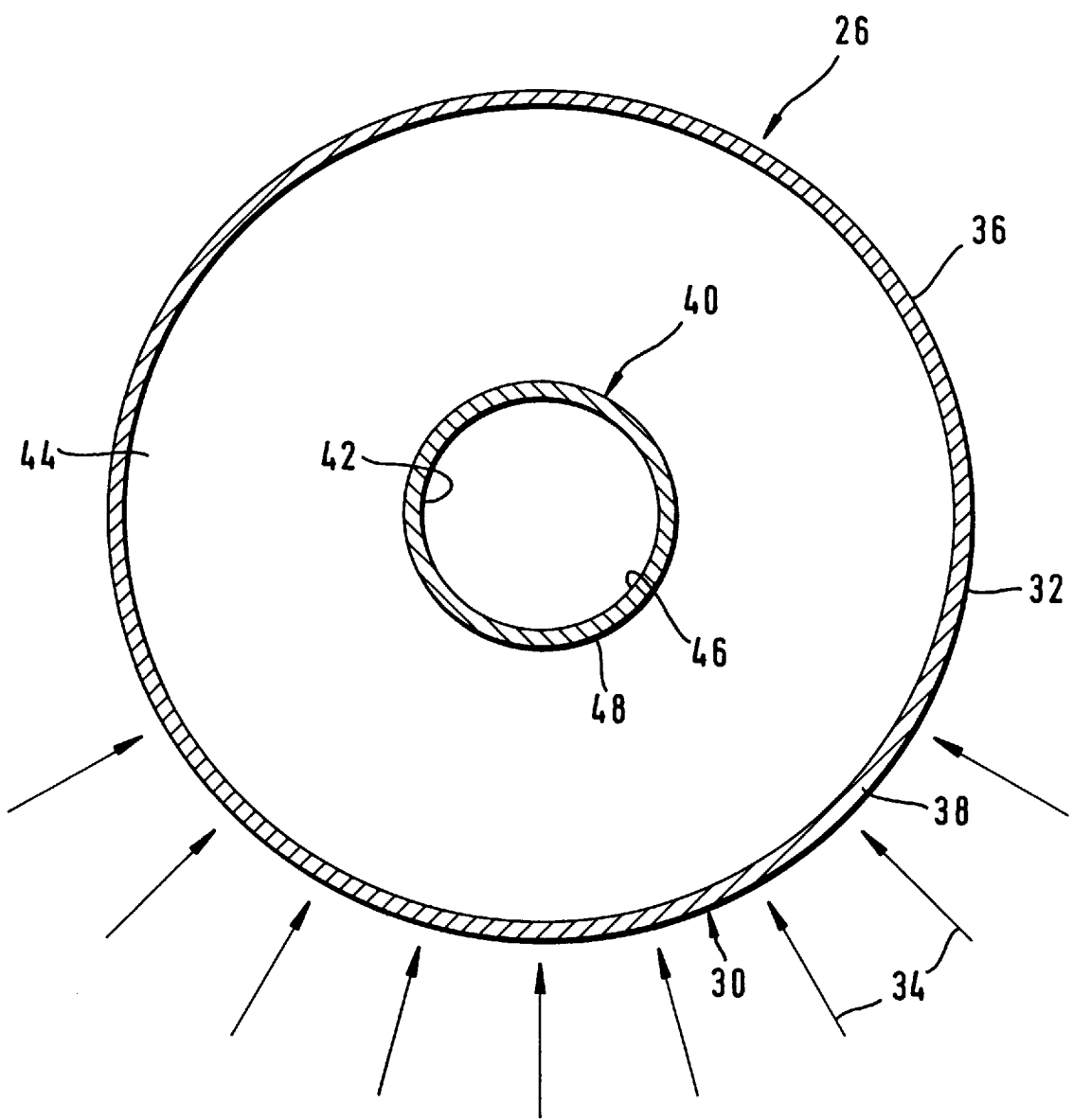
FIG. 2 shows a cross section through an inventive absorber line.

The absorber line 26 comprises an absorber screen 30, the absorber surfaces 32 of which absorb the radiation 34 reflected from the mirror surface 20. In the variation of an embodiment shown in FIG. 2, an absorber pipe 36 forms the absorber screen 30. A cylinder element 38 of the absorber screen 30 facing the mirror is irradiated as a result of the reflected radiation 34.

A guide tube 40 extending in longitudinal direction 12 is arranged inside the absorber pipe 36. In the variation of an inventive embodiment shown in FIG. 2, the guide tube 40 extends coaxially to the absorber pipe 36. A heat transport medium flows in the interior 42 of the guide tube 40 in longitudinal direction 12 through the trough-shaped collector 10 and has the task of removing heat from the trough-shaped collector 10. Water is preferably used as heat transport medium.

An annular chamber 44 which extends in longitudinal direction 12 is formed by an intermediate space between guide tube 40 and absorber pipe 36. The term annular chamber is to be understood such that it also applies for non-coaxial arrangements.

An annular passage medium flows in the annular chamber 44 in longitudinal direction 12, in the same direction of flow as the heat transport medium in the guide tube 40. The annular passage medium serves as heat transfer medium for the transfer to the heat transport medium conveyed in the guide tube 40 of the heat resulting due to absorption of the radiation 34 on the absorber surfaces 32. Due to the use of an annular passage medium for the transfer of heat, it is possible for the guide tube to be heated over its entire circumference while the reflected radiation 34 is absorbed only by the cylinder element 38 of the absorber pipe 36 facing the mirror.

Figure 3:
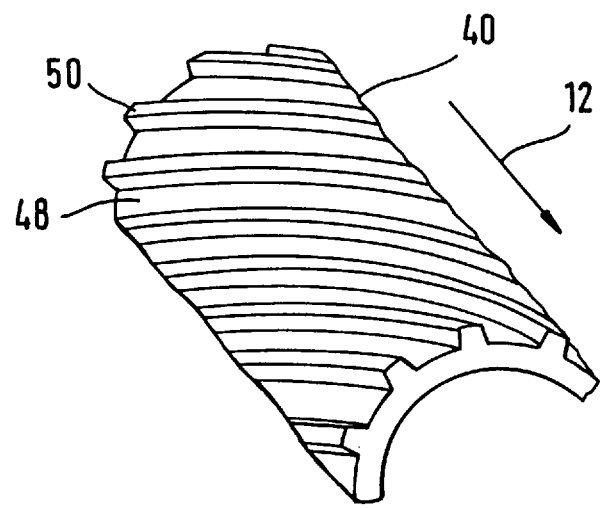
FIG. 3 shows a cross section through an inventive variation of a guide tube, showing the inner side of the guide tube.

In a variation of an inventive embodiment, as shown in FIG. 3, the outer cylindrical surface 48 of the guide tube 40 has a helical structure which comprises elevations 50 extending at an angle to the longitudinal direction 12, these elevations rising from the outer cylindrical surface 48 and extending parallel to one another and at a distance from one another.

Due to the helical arrangement of the elevations 50, the annular passage medium flowing in the annular passage 44 is given an angular momentum which promotes the intermixing of the annular passage medium and thus leads to a more uniform heating of the annular passage medium over the entire cross section (FIG. 2) of the annular chamber 44. Again as a result of this, the guide tube 40 is heated more evenly in circumferential direction over its outer cylindrical surface 48 by the annular passage medium.

Figure 4:
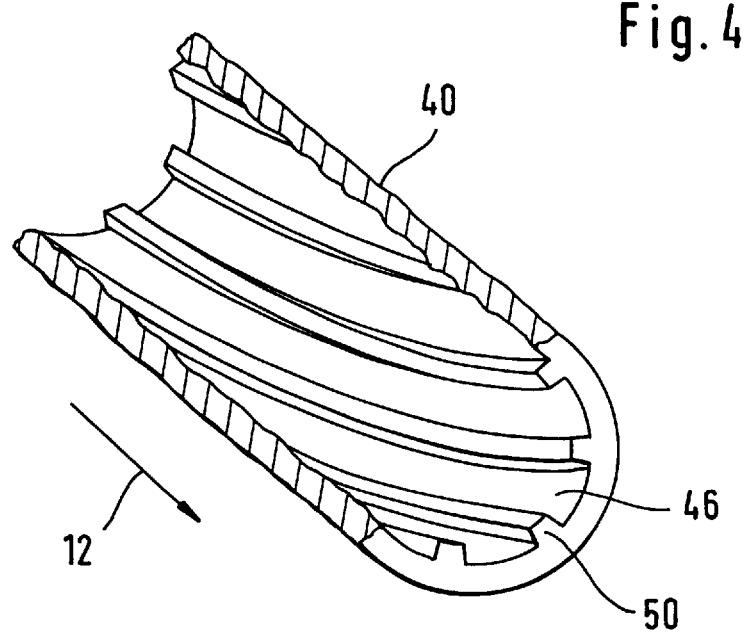
FIG. 4 similar to FIG. 3 but now showing the outer side of the guide tube.

In a further variation (FIG. 4), the inner cylindrical surface 46 of the guide tube 40 likewise has a structure. This comprises elevations 50 which protrude from the inner cylindrical surface 46 in the direction of the interior of the tube and extend helically at an angle to the longitudinal direction 12 and at a distance parallel to one another. This structure sees to it that the heat transport medium flowing in the interior of the guide tube 40 is given an angular momentum and thereby intermixed better. The heat transport medium can thus absorb the heat transferred from the annular passage medium flowing in the annular chamber 44 to the guide tube 40 in an efficient manner.

Figure 5:
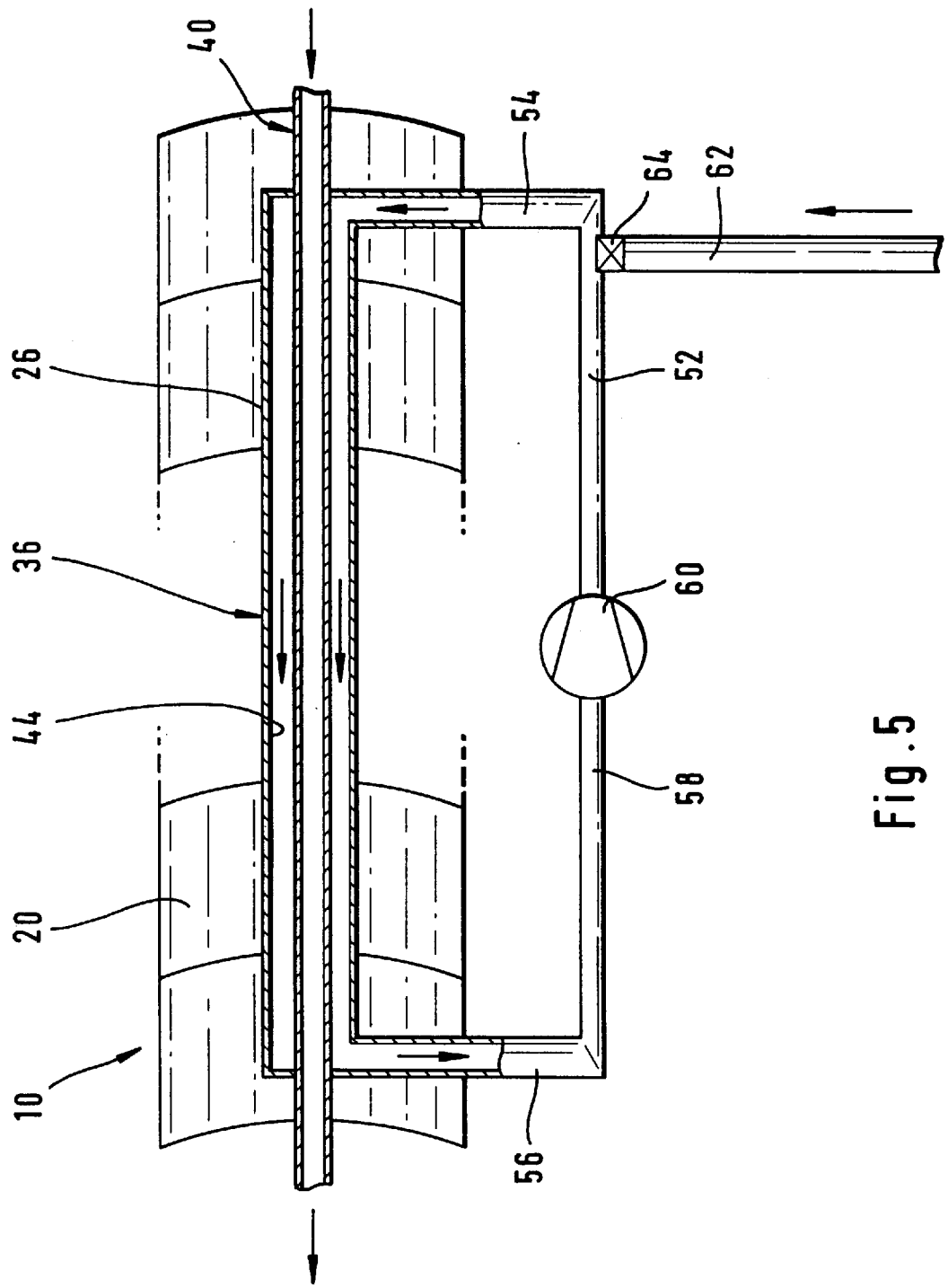
FIG. 5 shows a schematic illustration of a closed circuit for annular passage medium and FIG. 6 shows a longitudinal section of the absorber line.

The annular passage medium is conveyed in a closed circuit 52 (FIG. 5). The circuit comprises the annular chamber 44 extending inside the trough-shaped collector 10; a line 54 which opens into the annular chamber 44 in the vicinity of the one end of the trough-shaped collector 10 and via which annular passage medium flows into the annular chamber 44, heat transport medium and annular passage medium having the same direction of flow in the interior of the trough-shaped collector 10; a line 56, into which the annular chamber 44 opens in the vicinity of the other end of the trough-shaped collector 10 and through which annular passage medium flows out of the annular chamber 44; a line 58 which connects the lines 54 and 56 with one another and thus completes the circuit 52.

The circuit 52 has a pump 60 which generates the necessary flow velocity of the annular passage medium in the circuit 52. Since the annular passage medium flowing in the circuit 52 serves to transfer heat, it is advantageous when the mass flow rate, generated by the pump 60, of annular passage medium through the annular chamber 44 in the trough-shaped collector 10 is greater than the mass flow rate of heat transport medium flowing in the guide tube 40 through the trough-shaped collector 10. For example, the mass flow rate in the annular chamber 44 could be greater approximately by a factor of ten than the mass flow rate in the guide tube 40.

The lines 54, 56 and 58 and the pump 60 are preferably arranged such that they do not mask the radiation 34 reflected from the mirror surface 20 on its path to the absorber screen 30.

The annular passage medium in the circuit 52 is subject to a pressure which, when water is used as annular passage medium, can be, for example, in the range of approximately 100 to 200 bars and so the water used in this case as annular passage medium is present in the fluid state at the maximum temperatures which can be attained in the trough-shaped collector 10. It is advantageous when losses of annular passage medium and thus losses of pressure in the circuit 52 can be compensated. The circuit 52 therefore has an additional supply line 62, through which annular passage medium which is preferably preheated can be fed into the circuit 52 via a valve 64.

In a variation of an inventive embodiment, the same medium, preferably water, is used as heat transport medium and as annular passage medium.

This results in the possibility of undertaking a temperature regulation by way of spraying annular passage medium from the annular chamber 44 into the interior 42 of the guide tube 40.

Figure 6:
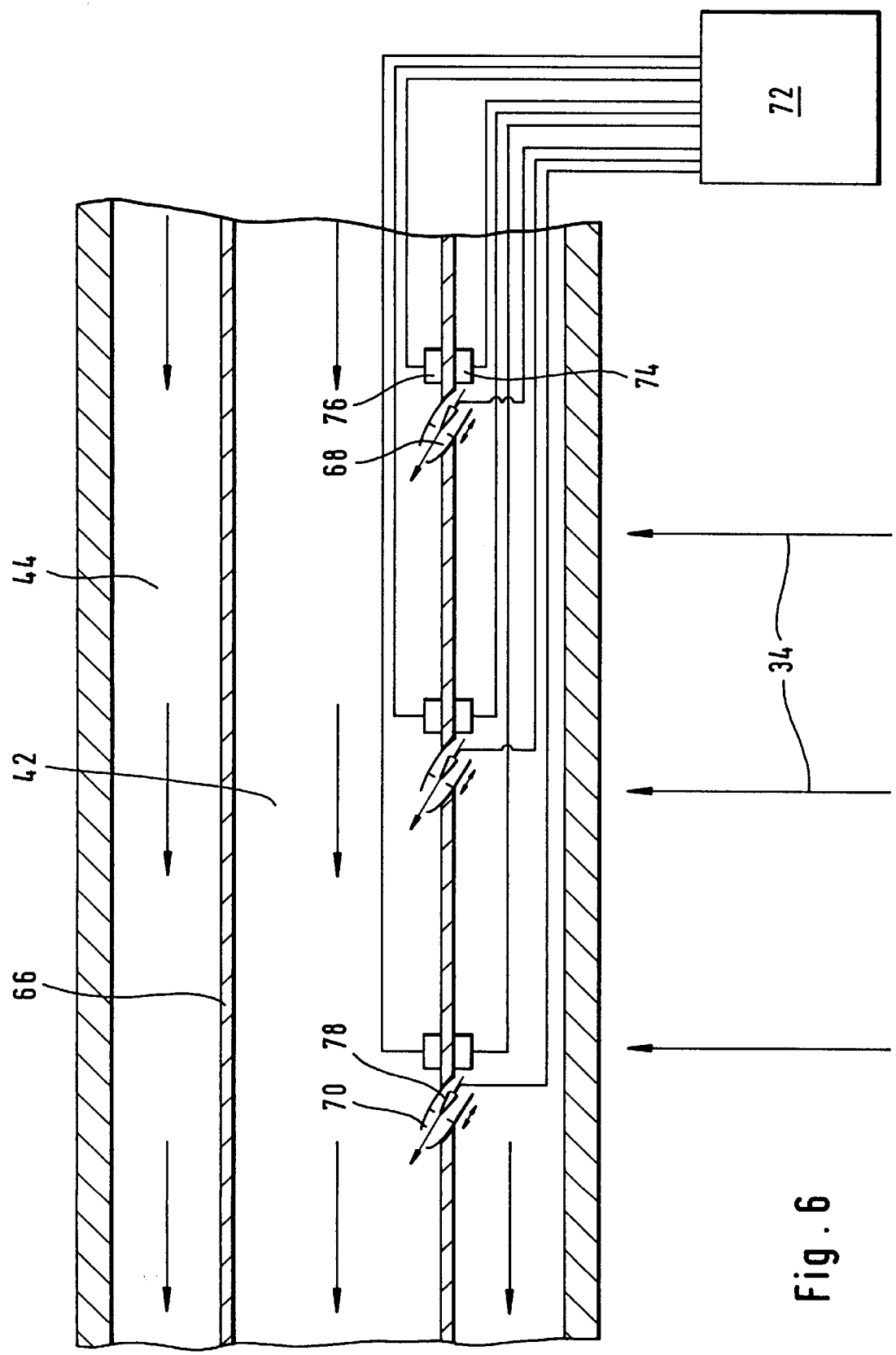

As shown in FIG. 6, the walls 66 of the guide tube 40 have for this purpose openings 68, in which nozzle elements 70 are seated. The openings 68 are thereby arranged in spaced relationship in longitudinal direction 12. The distance between them need not necessarily be constant. For example, it could be advantageous when the distance is shorter in the vicinity of the one end of the trough-shaped collector 10, at which the heat transport medium flows into the trough-shaped collector 10, and the distance is greater in the vicinity of the other end, at which the heat transport medium flows out of the trough-shaped collector 10. One or several nozzle elements 70 can be arranged in circumferential direction.

The nozzle elements 70 can be controlled with respect to their rate of flow, each nozzle element preferably being actuatable individually. This control takes place via a control unit 72.

A temperature sensor 74 is preferably associated with each nozzle element 70 and this is favorably seated on the outer cylindrical surface 48 of the guide tube 40 in front of a nozzle element 70—in relation to the direction of flow. The temperature sensors 74 measure the temperature in the annular passage medium and pass these temperature values to the control unit 72.

Temperature sensors 76 are likewise seated on the inner cylindrical surface 46 of the guide tube 40. They measure the temperature in the heat transport medium and likewise pass these values to the control unit 72.

If the temperature in the annular passage medium measured by the temperature sensors 74 is too high so that, in particular, the risk is imminent of the fluid annular passage medium vaporizing, the control unit 72 provides for annular passage medium to be sprayed into the interior of the guide tube 40 from the annular chamber 44 via the nozzle elements 70.

The corresponding amount of annular passage medium which has been sprayed into the guide tube 40 via the nozzle elements 70 is again fed into the circuit 52 via the valve 64. This means that a cooling of the annular passage medium in the circuit 52 occurs. The flow capacity through the nozzle elements 70 is thereby controlled such that the optimum operating temperature is reached in the annular passage medium.

In order to control the flow capacity through the nozzle elements, these have a valve drive 78. The valve drive 78 is advantageously an electric motor which is remote-controlled by the control unit 72.

Additional control possibilities also result. If, for example, the supply of the heat transport medium into the trough-shaped collector 10 is interrupted, the case may then occur that the absorber line 26 is no longer adequately cooled and thus damage is impending. When the temperature sensors 76 register temperatures in the interior 42 of the guide tube 40 which are too high, the control unit 72 provides for annular passage medium to be increasingly sprayed into the guide tube 40 from the circuit 52 via the nozzle elements 70 so that an adequate amount of fluid is located in the interior 42 of the guide tube 40 and an adequate cooling of the absorber line 26 is ensured. The amount of fluid sprayed into the guide tube 40 and thus missing in the circuit 52 is fed into the circuit 52 again via the valve 64 and the supply line 62.

What is claimed is:
1. A trough-shaped collector for radiation, comprising:
   a trough-shaped mirror extending in a longitudinal direction and reflecting the radiation into a focus region; and
   an absorber line extending in said longitudinal direction through the focus region of the trough-shaped mirror;
   said absorber line comprising:
      an absorber pipe having an absorber screen which absorbs the radiation reflected from said mirror;
      a guide tube adapted to carry a heat transport medium for transporting heat resulting from radiation absorbed by said absorber screen;
      said absorber pipe surrounding the guide tube such that an annular chamber is formed between said guide tube and said absorber pipe,
      said annular chamber being adapted to carry an annular passage medium in said longitudinal direction via a closed circuit to efficiently transfer the heat resulting due to said absorption from said absorber pipe to said guide tube and heat said guide tube essentially over its entire circumference.
2. A trough-shaped collector as defined in claim 1, wherein:
   said has a substantially circular cross-section, and said absorber screen is disposed at an outer circumference of said absorber pipe for absorbing the radiation reflected from said trough-shaped mirror.
3. A trough-shaped collector as defined in claim 1, wherein:
   the annular passage medium comprises the same substance as the heat transport medium.
4. A trough-shaped collector as defined in claim 1, further comprising:
   nozzle elements arranged in the guide tube for introducing said annular passage medium from said annular chamber into said guide tube.

5. A trough-shaped collector as defined in claim 4, wherein:
   said nozzle elements spray said annular passage medium from said annular chamber into said guide tube.

6. A trough-shaped collector as defined in claim 4, further comprising:
   a control unit for registering a temperature of the annular passage medium in the annular chamber and a temperature of the heat transport medium in the guide tube via temperature sensors, and for controlling an amount of annular passage medium introduced via the nozzle elements from the annular chamber into the guide tube for the purpose of temperature regulation.

7. A trough-shaped collector as defined in claim 6, wherein:
   the nozzle elements each have a valve drive for controlling a flow capacity through the nozzle elements.

8. A trough-shaped collector as defined in claim 1, wherein:
   said guide tube has a structured outer cylindrical surface for aiding intermixing of the annular passage medium.

9. A trough-shaped collector as defined in claim 1, wherein:
   an inner cylindrical surface of the guide tube has a flow-stabilizing structure.

10. A trough-shaped collector as defined in claim 1, wherein:
    said annular passage medium and said heat transport medium are adapted to flow independently of one another.

11. A trough-shaped collector as defined in claim 1, wherein:
    said annular passage medium comprises water.

12. A trough-shaped collector as defined in claim 1, further comprising:
    means for adjusting said annular passage medium to a pressure above atmospheric pressure to maintain the annular passage medium present in a fluid state at a maximum attainable temperature.

13. A trough-shaped collector for radiation, comprising:
    (a) a trough-shaped mirror extending in a longitudinal direction and reflecting the radiation into a focus region;
    (b) an absorber line extending in said longitudinal direction through the focus region of the trough-shaped mirror;
    said absorber line comprising:
       a guide tube adapted to carry a heat transport medium;
       an absorber pipe surrounding the guide tube such that an annular chamber is formed between said guide tube and said absorber pipe, said annular chamber being adapted to carry an annular passage medium in said longitudinal direction to couple the guide tube thermally to the absorber pipe; and
    (c) nozzle elements arranged in the guide tube for introducing said annular passage medium from said annular chamber into said guide tube.

14. A trough-shaped collector as defined in claim 13, wherein:
    said nozzle elements spray said annular passage medium from said annular chamber into said guide tube.

15. A trough-shaped collector as defined in claim 13, further comprising:
    a control unit for registering a temperature of the annular passage medium in the annular chamber and a temperature of the heat transport medium in the guide tube via temperature sensors, and for controlling an amount of annular passage medium introduced via the nozzle elements from the annular chamber into the guide tube for the purpose of temperature regulation.

16. A trough-shaped collector as defined in claim 15, wherein:
    the nozzle elements each have a valve drive for controlling a flow capacity through the nozzle elements.

17. A trough-shaped collector as defined in claim 13, wherein:
    said annular passage medium and said heat transport medium flow independently of one another.

\* \* \* \* \*

UNITED STATES PATENT AND TRADEMARK OFFICE
CERTIFICATE OF CORRECTION

PATENT NO. : 5,860,414
DATED : January 19, 1999
INVENTOR(S) : Steinmann

It is certified that error appears in the above-identified patent and that said Letters Patent is hereby corrected as shown below:

Column 6, line 56: In claim 2, "said has a substantially circular cross-section" is changed to --said absorber pipe has a substantially circular cross-section--.

Signed and Sealed this

Fifteenth Day of June, 1999

Attest:

Q. TODD DICKINSON

Attesting Officer

Acting Commissioner of Patents and Trademarks